United States Patent
Kurosawa

(10) Patent No.: US 7,889,238 B2
(45) Date of Patent: Feb. 15, 2011

(54) MULTICAMERA SYSTEM, IMAGE PICKUP APPARATUS, CONTROLLER, IMAGE PICKUP CONTROL METHOD, IMAGE PICKUP APPARATUS CONTROL METHOD, AND IMAGE PICKUP METHOD

(75) Inventor: Koji Kurosawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 11/401,322

(22) Filed: Apr. 11, 2006

(65) Prior Publication Data

US 2006/0232679 A1   Oct. 19, 2006

(30) Foreign Application Priority Data

Apr. 15, 2005   (JP) .............................. 2005-117625

(51) Int. Cl.
*H04N 5/232* (2006.01)
(52) U.S. Cl. ............... 348/211.11; 348/159; 348/211.4; 348/231.2; 348/231.99; 348/239; 348/218.1
(58) Field of Classification Search ............ 348/E5.047, 348/E7.009, 159, 211.4, 211.11, 231.2, 231.99, 348/239, 218.1
See application file for complete search history.

(56) References Cited

U.S. PATENT DOCUMENTS

2004/0081437 A1* 4/2004 Asada et al. ................ 386/131
2006/0013507 A1* 1/2006 Kaneko et al. .............. 382/312

FOREIGN PATENT DOCUMENTS

| JP | 2001-211347 | 8/2001 |
| JP | 2004-266458 | 9/2004 |
| JP | 2005-39707 | 2/2005 |
| JP | 2005-39709 | 2/2005 |
| WO | WO 2005/009031 A1 | 1/2005 |
| WO | WO 2005009031 A1 * | 1/2005 |

* cited by examiner

*Primary Examiner*—Jason Chan
*Assistant Examiner*—Yih-Sien Kao
(74) *Attorney, Agent, or Firm*—Oblon, Spivak, McClelland, Maier & Neustadt, L.L.P.

(57) ABSTRACT

A multicamera system including: a controller having a reset phase transmitting unit for transmitting information showing a reset phase corresponding to a position in a frame synchronized with a sync reference signal to one or each of plural image pickup apparatuses within a frame period of a one-precedent frame of the frame; and the one or plural image pickup apparatuses each having an image pickup unit for photographing light from an object, an image pickup driving unit for driving the image pickup unit so as to start the photographing of one image pickup frame on the basis of the reset phase information transmitted from the controller, and an output unit for outputting image pickup data of the one image pickup frame photographed by the image pickup unit on the basis of the sync reference signal transmitted from the controller.

14 Claims, 8 Drawing Sheets

Fig. 7

VIDEO SIGNAL (1125 LINES /FRAME, 2200 PIXELS/LINE)

| FRAME RATIO | THE NUMBER OF PIXELS PIXELS/LINE | FRAME SEQUENCE NO. | RESET | RESET PHASE |
|---|---|---|---|---|
| 2/3 | 3300 | 0 | PRESENCE | LINE = 1/PIXEL = 0 |
| | | 1 | PRESENCE | LINE = 563/PIXEL = 1100 |
| | | 2 | ABSENCE | |
| 1/2 | 4400 | 0 | PRESENCE | LINE = 1/PIXEL = 0 |
| | | 1 | ABSENCE | |
| 1/3 | 6600 | 0 | PRESENCE | LINE = 1/PIXEL = 0 |
| | | 1 | ABSENCE | |
| | | 2 | ABSENCE | |

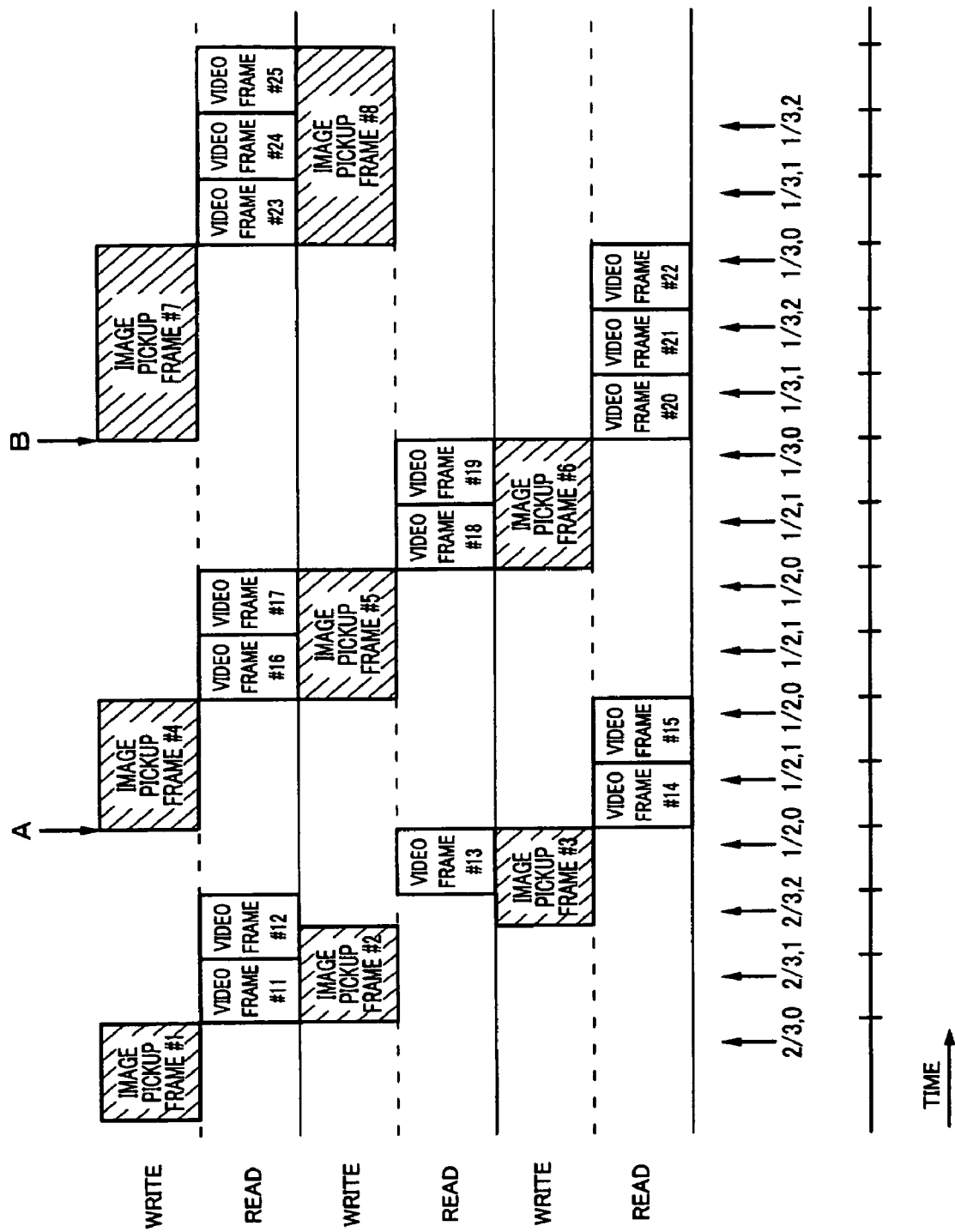

MULTICAMERA SYSTEM, IMAGE PICKUP APPARATUS, CONTROLLER, IMAGE PICKUP CONTROL METHOD, IMAGE PICKUP APPARATUS CONTROL METHOD, AND IMAGE PICKUP METHOD

CROSS REFERENCES TO RELATED APPLICATIONS

The present invention contains subject matter related to Japanese Patent Application JP 2005-117625 filed in the Japanese Patent Office on Apr. 15, 2005, the entire contents of which being incorporated herein by reference.

BACKGROUND OF THE INVENTION

1. Field of the Invention

The invention relates to a multicamera system which can photograph at a variable speed, an image pickup apparatus, a controller, an image pickup control method, an image pickup apparatus control method, and an image pickup method.

2. Description of the Related Arts

In broadcasting apparatuses such as image pickup apparatus, editing apparatus, and the like which are used in a broadcasting station or a studio, a sync signal which is used in common in the broadcasting station or the studio is supplied and the apparatuses are synchronized on the basis of the sync signal. In a broadcasting system in the related art, even if an object is photographed by using a plurality of image pickup apparatuses, upon reproduction, when video signals outputted from the image pickup apparatuses are switched, they can be reproduced without deviating timing of video images.

In a special photographing or the like, there is a case where the variable-speed photographing for photographing on the assumption that the photographed object is seen as if it moved faster than the speed upon photographing. For example, in the case of the photographing using a film, upon photographing, the photographing is executed in the state where a rotational speed of the film is made lower than that upon normal photographing, and upon projection, the film is rotated at a normal speed, thereby enabling a high-speed projection to be realized.

For example, in the case of recording photographed video images by digital video data, the photographing and recording are executed in a normal manner, video frames are extracted from the recorded digital video data at predetermined intervals, and the extracted video frames are continuously reproduced, thereby realizing a high-speed reproduction.

SUMMARY OF THE INVENTION

However, in the case of the variable-speed photographing using the digital video data according to the method in the related art, the number of video frames to be recorded is larger than the number of video frames which are used for reproduction, and the video frames which are unnecessary for the reproduction are also recorded, so that a recording medium whose memory capacity is larger than a data capacity of the reproduction video frames is necessary.

To solve such a problem, there has been proposed an image pickup apparatus which can perform the variable-speed photographing, in which the object is photographed while setting a frame frequency of the video frames upon photographing to be lower than that of the video frames upon reproduction, and upon reproduction, the video frames are reproduced as a video signal of the specified frame frequency, thereby realizing the high-speed reproduction.

The case of executing the variable-speed photographing by using a plurality of image pickup apparatuses which can perform the variable-speed photographing as mentioned above will now be considered. In such a case, since a frame frequency of the image pickup frames upon photographing differs from that of the video frames upon reproduction, it is necessary not only to synchronize the video frames which are outputted from the image pickup apparatuses but also to synchronize the image pickup frames in order to match the timing for photographing.

As a method of synchronizing the image pickup frames of the variable speed of a plurality of image pickup apparatuses, there is a method whereby a timing signal corresponding to the variable speed for allowing the image pickup frames to be synchronized is multiplexed to the sync signal which is used in the current broadcasting system and the resultant sync signal is supplied to each of the image pickup apparatuses. Details of the above method have been disclosed in, for example, International Publication Patent No. WO2005/009031 which has already been filed by the same applicant as the present invention. However, in this case, there is such a problem that it is difficult to obtain compatibility between the sync signal in the related art and the sync signal to which the timing signal corresponding to the variable speed has been multiplexed.

As another method of synchronizing the image pickup frames of the variable speed of a plurality of image pickup apparatuses, there is also a method whereby the timing of the image pickup frames of the variable speed is designated by using a control command for controlling the image pickup apparatus. However, since the control command is an asynchronous signal, it is difficult to designate the accurate timing, and there is a risk that it is extremely difficult to synchronize the image pickup frames.

It is desirable to provide a multicamera system which synchronizes image pickup frames of a plurality of image pickup apparatuses upon photographing at a variable speed and to provide an image pickup apparatus, a controller, an image pickup control method, an image pickup apparatus control method, and an image pickup method.

According to an embodiment of the present invention, there is provided a multicamera system comprising: a controller having a reset phase transmitting unit for transmitting information showing a reset phase corresponding to a position in a frame synchronized with a sync reference signal to one or each of a plurality of image pickup apparatuses within a frame period of a one-precedent frame of the frame; and the one or the plurality of image pickup apparatuses each having an image pickup unit for photographing light from an object, an image pickup driving unit for driving the image pickup unit so as to start the photographing of one image pickup frame on the basis of the information which shows the reset phase and has been transmitted from the controller, and an output unit for outputting image pickup data of the one image pickup frame photographed by the image pickup unit on the basis of the sync reference signal transmitted from the controller.

According to an embodiment of the present invention, there is provided an image pickup control method comprising the steps of: transmitting information showing a reset phase corresponding to a position in a frame synchronized with a sync reference signal to one or each of a plurality of image pickup apparatuses within a frame period of a one-precedent frame of the frame; allowing the one or each of the plurality of image pickup apparatuses to start photographing of one image pickup frame on the basis of the transmitted information showing the reset phase; and outputting image pickup data of the one image pickup frame obtained by the photographing on the basis of the sync reference signal.

According to an embodiment of the present invention, there is provided a controller for controlling one or a plurality of image pickup apparatuses, comprising: a reset phase transmitting unit transmitting information showing a reset phase corresponding to a position in a frame synchronized with a sync reference signal to the one or each of the plurality of image pickup apparatuses within a frame period of a one-precedent frame.

According to an embodiment of the present invention, there is provided an image pickup apparatus control method of controlling one or a plurality of image pickup apparatuses, comprising the step of: transmitting information showing a reset phase corresponding to a position in a frame synchronized with a sync reference signal to the one or each of the plurality of image pickup apparatuses within a frame period of a one-precedent frame.

According to an embodiment of the present invention, there is provided an image pickup apparatus comprising: an image pickup unit photographing light from an object; an image pickup driving unit driving the image pickup unit so as to start the photographing of one image pickup frame on the basis of information showing a reset phase corresponding to a position in a frame synchronized with a sync reference signal transmitted from an outside; and an output unit outputting image pickup data of the one image pickup frame photographed by the image pickup unit on the basis of the sync reference signal transmitted from the outside.

According to an embodiment of the present invention, there is provided an image pickup method comprising the steps of: starting photographing of one image pickup frame on the basis of information showing a reset phase corresponding to a position in a frame synchronized with a sync reference signal transmitted from an outside; and outputting image pickup data of the one image pickup frame obtained by the photographing on the basis of the sync reference signal transmitted from the outside.

As mentioned above, according to an embodiment of the invention, the information showing the reset phase corresponding to the position in the frame synchronized with the sync reference signal is transmitted to one or each of the plurality of image pickup apparatuses within the frame period of the one-precedent frame. One or each of the plurality of image pickup apparatuses starts the photographing of the one image pickup frame on the basis of the information which shows the reset phase and has been transmitted from the controller and outputs the image pickup data of the one image pickup frame obtained by the photographing on the basis of the sync reference signal transmitted from the controller. Therefore, the image pickup frames which are outputted from the plurality of image pickup apparatuses can be synchronized.

According to an embodiment of the invention, since the information showing the reset phase corresponding to the position in the frame synchronized with the sync reference signal is transmitted to one or each of the plurality of image pickup apparatuses within the frame period of the one-precedent frame, the image pickup frames which are outputted from the plurality of image pickup apparatuses can be synchronized.

According to an embodiment of the invention, the photographing of the one image pickup frame is started on the basis of the information showing the reset phase corresponding to the position in the frame synchronized with the sync reference signal transmitted from the outside, and the image pickup data of the one image pickup frame obtained by the photographing is outputted on the basis of the sync reference signal transmitted from the outside. Therefore, even if a plurality of image pickup apparatuses are used, the image pickup frames which are outputted from the image pickup apparatuses can be synchronized.

According to an embodiment of the invention, the timing for reading out the video frames is controlled on the basis of the sync reference signal, thereby synchronizing the video frames of a plurality of image pickup apparatuses. Since the timing when the head position of the video frame is written is designated by using the timing for reading out the predetermined pixel of the video frame while setting the video frame to a reference, there is an effect that the image pickup frames which are outputted from the plurality of image pickup apparatuses can be synchronized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a schematic diagram showing correspondence relations of an example among a frame ratio, a frame sequence number, and a head position of the image pickup frame; and FIGS. 8A to 8E are schematic diagrams showing timing for the image pickup frames and the image pickup frames at the time of executing the variable-speed photographing by changing a frame frequency of the image pickup frames during the photographing.

DETAILED DESCRIPTION OF THE PREFERRED EMBODIMENT

Figure 1:
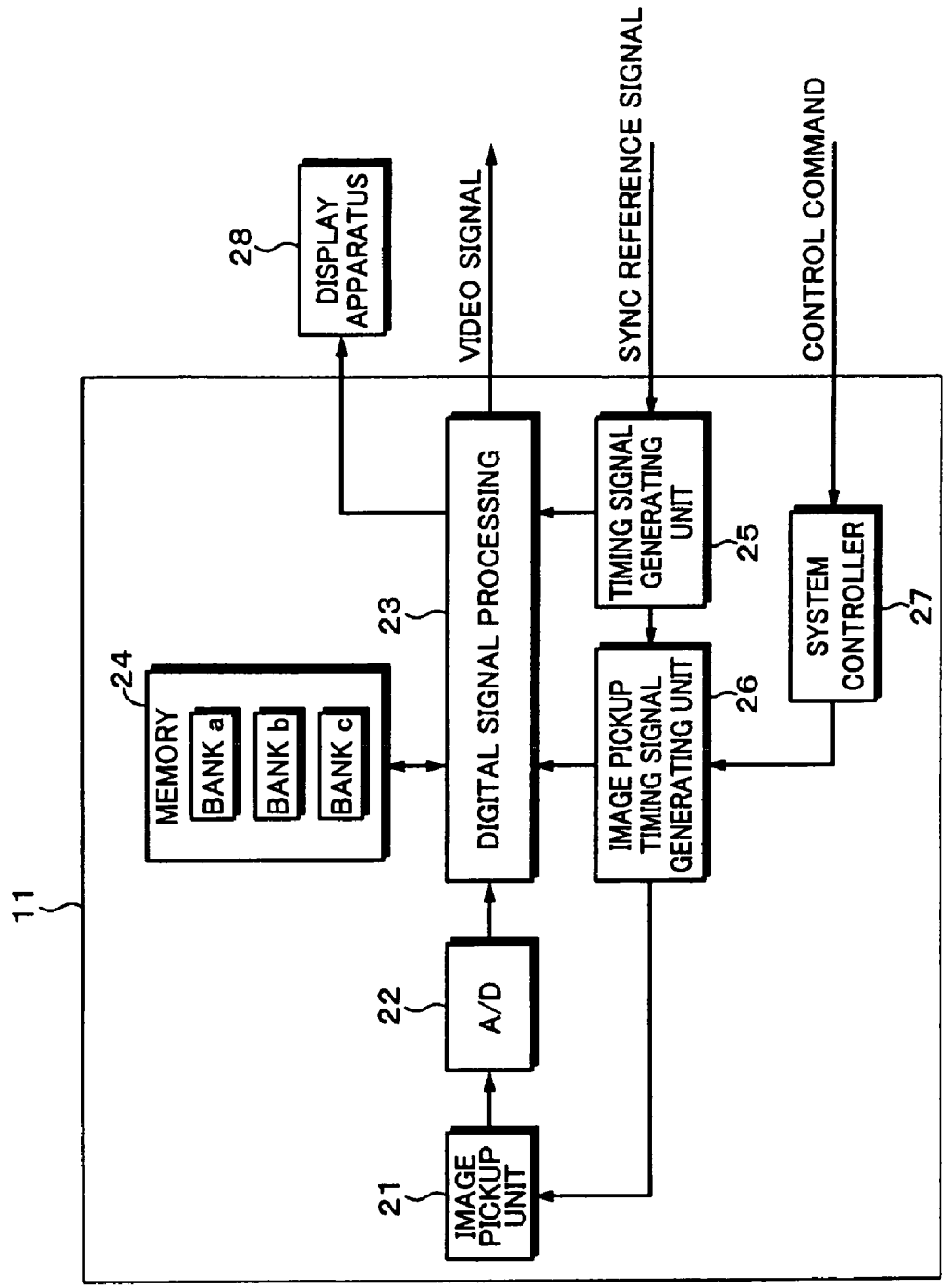
FIG. 1 is a block diagram showing a construction of an example of an image pickup apparatus 11 which can be applied to an embodiment of the invention.

An embodiment of the invention will be described hereinbelow with reference to the drawings. FIG. 1 shows a construction of an example of an image pickup apparatus 11 which can be applied to the embodiment of the invention. The image pickup apparatus 11 has, for example, an image pickup unit 21, an A/D converting unit 22, a digital signal processing unit 23, a memory 24, a timing signal generating unit 25, an image pickup timing signal generating unit 26, a system controller 27, and a display apparatus 28.

The timing signal generating unit 25 forms a timing signal on the basis of a sync reference signal supplied from an outside and transfers it to the digital signal processing unit 23 and the image pickup timing signal generating unit 26. If the image pickup apparatus 11 is used in a broadcasting station or a studio, the sync reference signal is a signal which is used in common in broadcasting apparatuses in the broadcasting station or the studio. For example, in the broadcasting station or the studio, video frames can be synchronized by using the sync reference signal.

The system controller 27 is constructed by, for example, a CPU (Central Processing Unit). In accordance with a program which has previously been stored in a ROM (Read Only Memory: not shown), the system controller 27 controls each unit in the image pickup apparatus 11 by using a RAM (Random Access Memory: not shown) as a work memory upon execution of the program. On the basis of a control command supplied from the outside, the system controller 27 forms a signal to decide a frame frequency of an image pickup frame of an image pickup signal and supplies it to the image pickup timing signal generating unit 26.

On the basis of the timing signal supplied from the timing signal generating unit 25 and the signal which has been supplied from the system controller 27 and is used to decide the frame frequency of the image pickup frame, the image pickup timing signal generating unit 26 forms an image pickup timing signal to decide the image pickup timing for the image pickup unit 21 and supplies it to the image pickup unit 21 and the digital signal processing unit 23.

The image pickup unit 21 uses, for example, CCDs (Charge Coupled Devices) as image pickup devices and photoelectrically converts the light received by the image pickup devices into an image pickup signal. In the image pickup devices, for example, 2200 pixels×1125 lines are used as valid pixels. The image pickup unit 21 outputs the image pickup signal of one frame on the basis of the image pickup timing signal supplied from the image pickup timing signal generating unit 26. The image pickup signal outputted from the image pickup unit 21 is supplied to the A/D converting unit 22, converted into the digital image pickup signal, and supplied to the digital signal processing unit 23.

The digital signal processing unit 23 executes predetermined signal processes such as γ (gamma) correction and white balance control to the supplied digital image pickup signal and writes the resultant signal into the memory 24. The memory 24 has at least three banks, as data writing areas, such as bank (a), bank (b), and bank (c) in each of which the video signal of at least one frame can be written. The data of the image pickup frame based on the digital image pickup signal supplied from the digital signal processing unit 23 is written into a predetermined one of the three banks. The data of the image pickup frame written in the bank in the memory 24 is read out of the bank in the memory 24 synchronously with the timing signal supplied from the timing signal generating unit 25. The read-out data is outputted as a video signal to the outside and supplied to the display apparatus 28.

The display apparatus 28 is used, for example, as a view finder and displays the video signal outputted from the digital signal processing unit 23.

A method of executing the variable-speed photographing by the image pickup apparatus 11 will now be described. The data of the image pickup frame which has been photographed by the CCDs of the image pickup unit 21, subjected to the predetermined signal processes and, thereafter, converted into the digital image pickup signal by the A/D converting unit 22 is written into the bank in the memory 24. As for the data of the image pickup frame written in the memory 24, all of the data of one image pickup frame is written and read out from the head position of the video frame synchronized with the sync reference signal which is received after completion of the writing of the data of the relevant image pickup frame.

It is assumed that, in the video frame synchronized with the sync reference signal, the frame frequency is equal to 30 Hz (Hertz), the number of lines per frame is equal to 1125 lines, and the number of pixels per line is equal to 2200 pixels.

The case of setting a speed upon reproduction to, for example, a value which is 1.5 times as high as that upon photographing will now be considered. Such a speed can be realized by a method whereby, for example, the video image photographed at the frame frequency of 20 Hz is reproduced at the frame frequency of 30 Hz. Therefore, if a ratio of the frame frequency of the image pickup frame to the frame frequency of the video frame synchronized with the sync reference signal is assumed to be a frame ratio, its value is equal to 2/3. If a clock frequency to drive the CCD and the number of lines per frame are set to fixed values, the number of pixels per line of the image pickup frame is equal to 3300 (pixels) obtained by multiplying 2200 (pixels) as the number of pixels per line in the case where the frame frequency of the video frame is equal to 30 Hz by 3/2 as a reciprocal number of the frame ratio.

That is, in the case of setting the speed upon reproduction to a value which is X times as high as that upon photographing, it is sufficient to set the frame ratio to 1/X. Therefore, the number of pixels per line is equal to "2200×X" (pixels) obtained by multiplying 2200 (pixels) as the number of pixels per line at the frame frequency of the image pickup frame based on the sync reference signal by X as a reciprocal number of the frame ratio.

Figure 2:
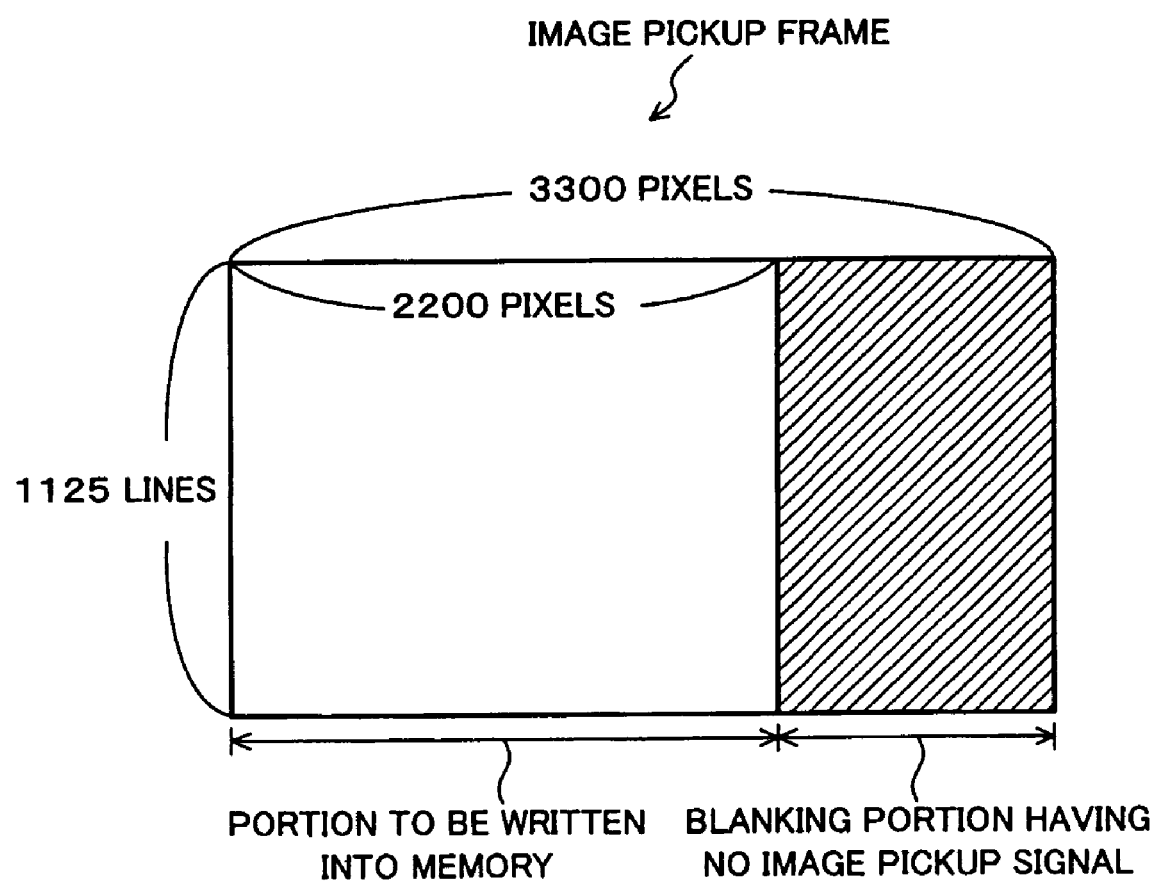
FIG. 2 is a schematic diagram showing an example of an image pickup frame.

The clock frequency to drive the CCD is set to the fixed value and the number of valid pixels per line of the CCD is also set to a fixed value irrespective of the frame frequency. Therefore, as shown in FIG. 2, for example, nothing is photographed so as to form a blanking portion for a period of time corresponding to 1100 pixels as a difference between the number of pixels (in this example, 3300 pixels) per line corresponding to the frame frequency of the image pickup frame and the number of pixels per line of the CCD. The data of the image pickup frame of 2200 pixels×1125 lines excluding the blanking portion is written into the bank in the memory 24.

Figure 3:
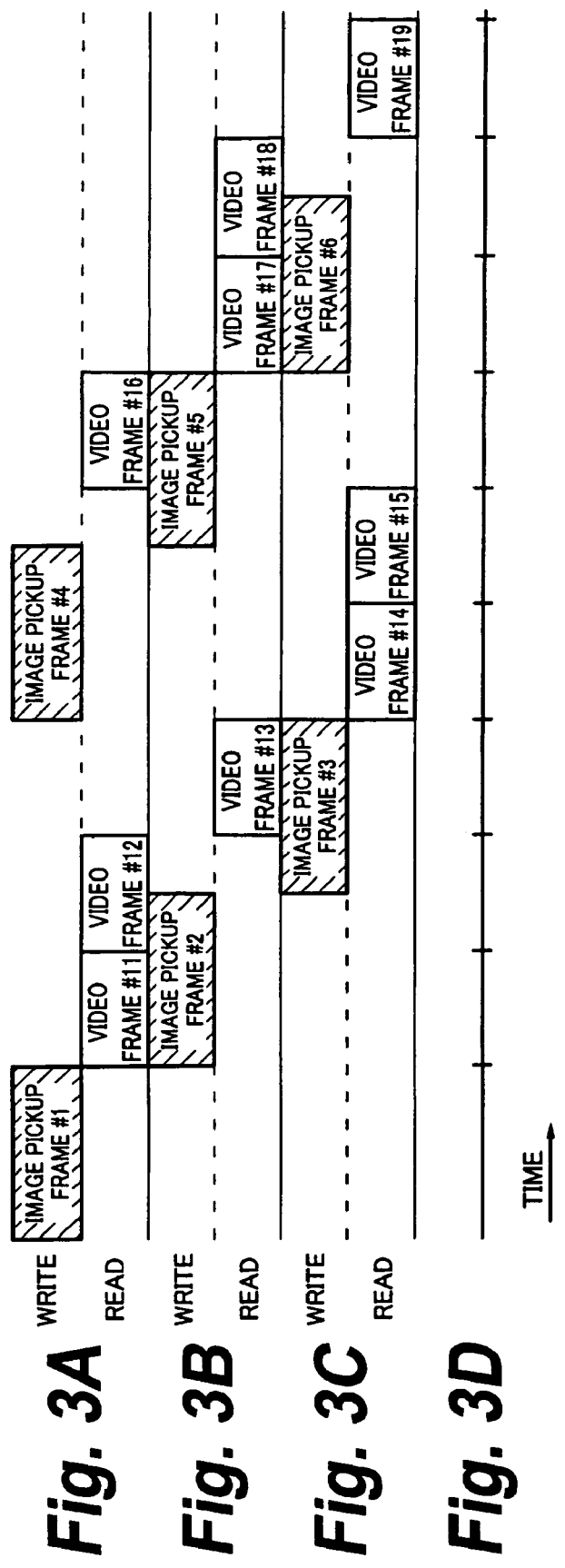
FIGS. 3A to 3D are schematic diagrams showing timing for image pickup frames and image pickup frames at the time of executing variable-speed photographing.

The method of executing the variable-speed photographing by the image pickup apparatus 11 will be more specifically described with reference to FIGS. 3A to 3D. FIG. 3A shows the timing for writing and reading the data into/from the bank (a). FIG. 3B shows the timing for writing and reading the data into/from the bank (b). FIG. 3C shows the timing for writing and reading the data into/from the bank (c). FIG. 3D shows the timing corresponding to the head position of the frame based on the sync reference signal.

The data of the image pickup frame is sequentially written into, for example, the three banks in the memory 24. The data of the image pickup frame after completion of the writing is read out of the head position of the video frame. Even after the reading of the data of the video frame was finished, if the writing of the next image pickup frame is not completed yet, the data of the relevant video frame is read out again at the head of the next video frame.

In FIGS. 3A to 3D, the data of the image pickup frame #1 is written into the bank (a) in the memory 24 (FIG. 3A). The data of the image pickup frame #1 written in the bank (a) is read out as a video frame #11 on the basis of the sync reference signal from the head position of the frame based on the sync reference signal which is received after completion of the writing of the data of the image pickup frame #1.

When the writing of the data of the image pickup frame #1 is completed, the data of the image pickup frame #2 is written into the bank (b) in the memory 24 (FIG. 3B) Since the writing of the data of the image pickup frame #2 is not completed yet at a point when the reading of the video frame #11 has been completed, the data of the image pickup frame

1 written in the bank (a) is read out again as a video frame #12 from the head position of the frame based on the sync reference signal. The data of the image pickup frame #2 written in the bank (b) is read out as a video frame #13 on the basis of the sync reference signal from the head position of the frame based on the sync reference signal which is received after completion of the writing of the data of the image pickup frame #2.

When the writing of the data of the image pickup frame #2 is completed, the data of the image pickup frame #3 is written into the bank (c) in the memory 24 (FIG. 3C) The data of the image pickup frame #3 written in the bank (c) is read out as a video frame #14 on the basis of the sync reference signal from the head position of the frame based on the sync reference signal which is received after completion of the writing of the data of the image pickup frame #3. When the writing of the data of the image pickup frame #3 is completed, the data of the image pickup frame #4 is written into the bank (a) in the memory 24. Since the writing of the data of the image pickup frame #4 is not completed yet at a point when the reading of the video frame #14 has been completed, the data of the image pickup frame #3 written in the bank (c) is read out again as a video frame #15 from the head position of the frame based on the sync reference signal.

After completion of the reading of the data of the video frame #15, the data of the image pickup frame #4 written in the bank (a) is read out as a video frame #16 on the basis of the sync reference signal from the head position of the frame based on the sync reference signal which is received after completion of the writing of the data of the image pickup frame #4.

In a manner similar to the above, the writing of the image pickup frame into each bank in the memory 24 and the reading of the video frame are executed.

By reading out the image pickup frame whose frame frequency is equal to 20 Hz as a video frame whose frame frequency is equal to 30 Hz and removing the overlapped video frames as mentioned above, when the video signal is reproduced, it can be reproduced as if the speed of the object was higher than the speed upon photographing by 1.5 times.

Figure 4:
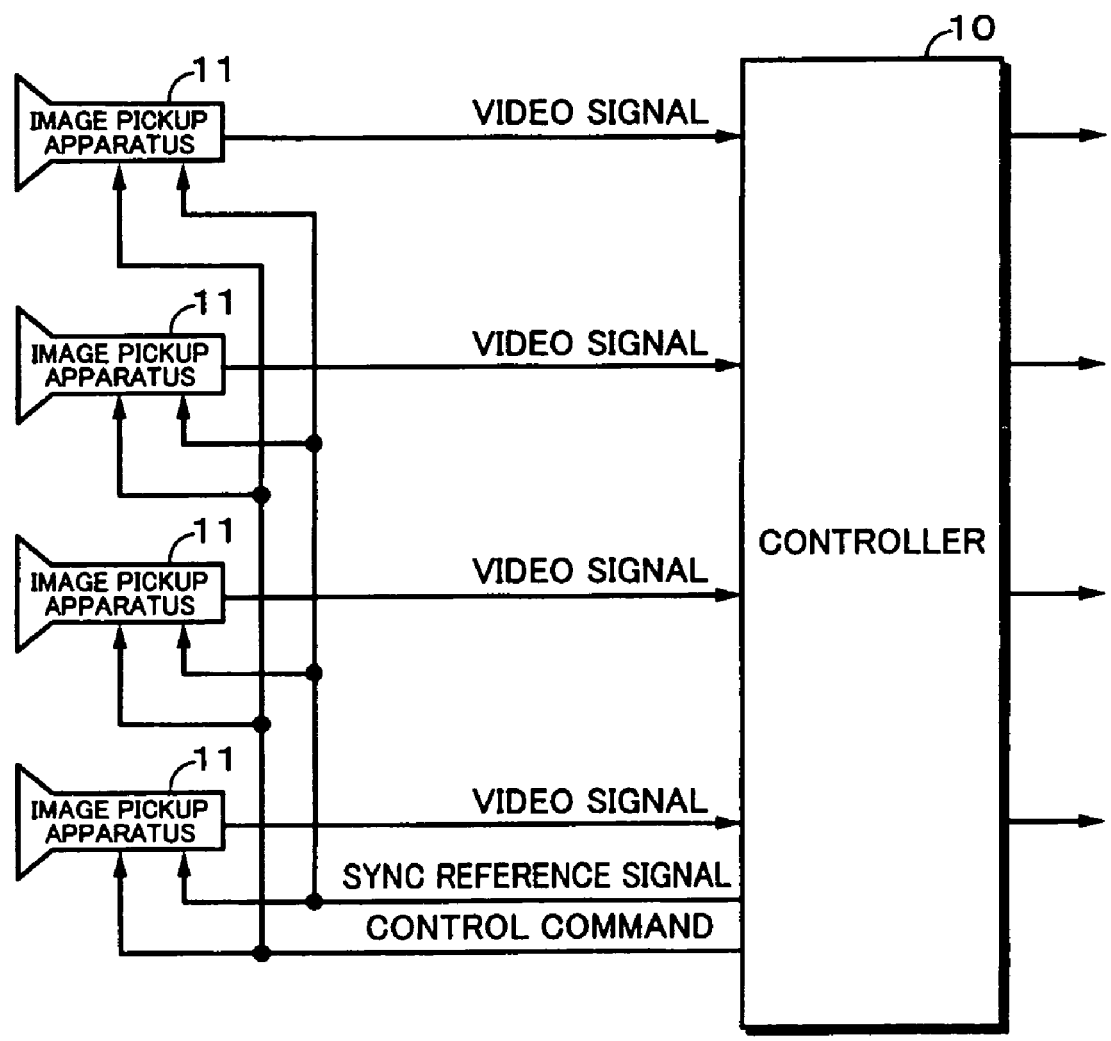
FIG. 4 is a block diagram showing a construction of an example of a multicamera system.

A construction of an example of a multicamera system 1 using a plurality of image pickup apparatuses 11 as mentioned above will now be described with reference to FIG. 4. Although the four image pickup apparatuses 11 are connected in FIG. 4, the invention is not limited to such a construction but the image pickup apparatuses of the number larger than 4 may be used. For example, the image pickup apparatuses of the number smaller than 4 may be also used.

The controller 10 forms a control command to control the image pickup apparatuses 11, 11, . . . , supplies it to the image pickup apparatuses 11, 11, . . . , and also supplies the sync reference signal thereto. The video signals supplied from the image pickup apparatuses 11, 11, . . . are supplied to the controller 10.

Figure 5:
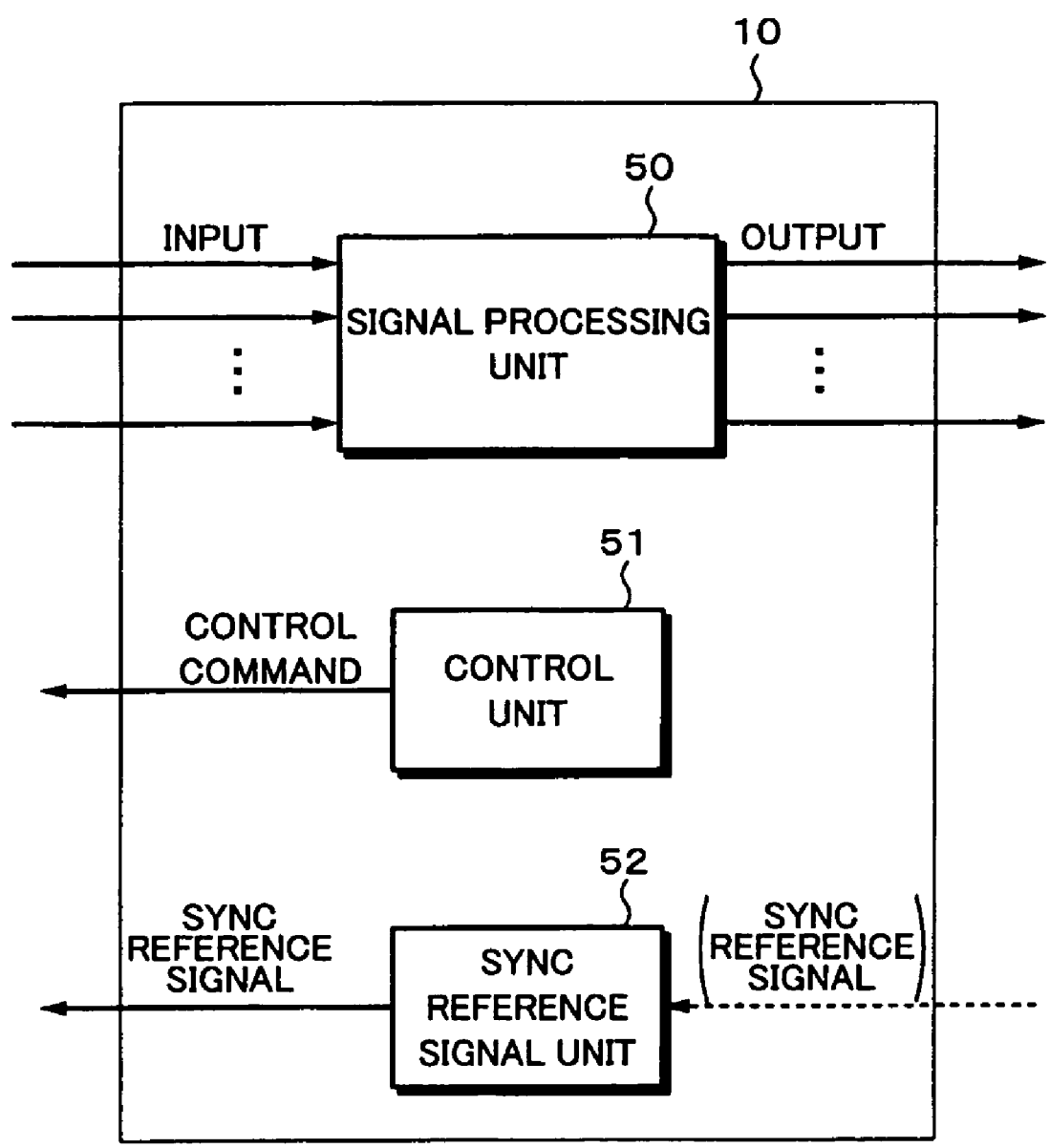
FIG. 5 is a block diagram showing a construction of an example of a controller.

FIG. 5 shows a construction of an example of the controller 10. A signal processing unit 50 executes predetermined signal processes to the inputted video signals and outputs the resultant signals to the outside. A control unit 51 forms a control command to control the image pickup apparatuses 11, 11, . . . and supplies the formed control command to the image pickup apparatuses 11, 11, . . . . A sync reference signal unit 52 supplies the sync reference signal to the image pickup apparatuses 11, 11, . . . . For example, the sync reference signal may be formed in the sync reference signal unit 52 or the sync reference signal supplied from the outside may be modified and outputted. For instance, the sync reference signal may be also supplied from an external apparatus to the image pickup apparatuses 11, 11, . . . . The whole controller 10 is controlled by, for example, a system controller (not shown).

A method of synchronizing the image pickup frames of the image pickup apparatuses 11, 11, . . . will now be considered. In the case of using a plurality of image pickup apparatuses 11, 11, . . . , there is a situation that each of the image pickup apparatuses 11, 11, . . . starts the photographing and the start timing for the photographing of the image pickup apparatuses 11, 11, . . . is deviated. Therefore, it is necessary to synchronize the image pickup frames of the image pickup apparatuses 11, 11, . . . .

Therefore, in the embodiment of the invention, in each of the image pickup apparatuses 11, 11, . . . , the timing to start the photographing is designated every image pickup frame by using the timing for reading out a predetermined pixel of the video frame while setting the video frame which is read out of the memory 24 to a reference, thereby synchronizing the image pickup frames of the image pickup apparatuses 11, 11, . . . .

Figure 6:
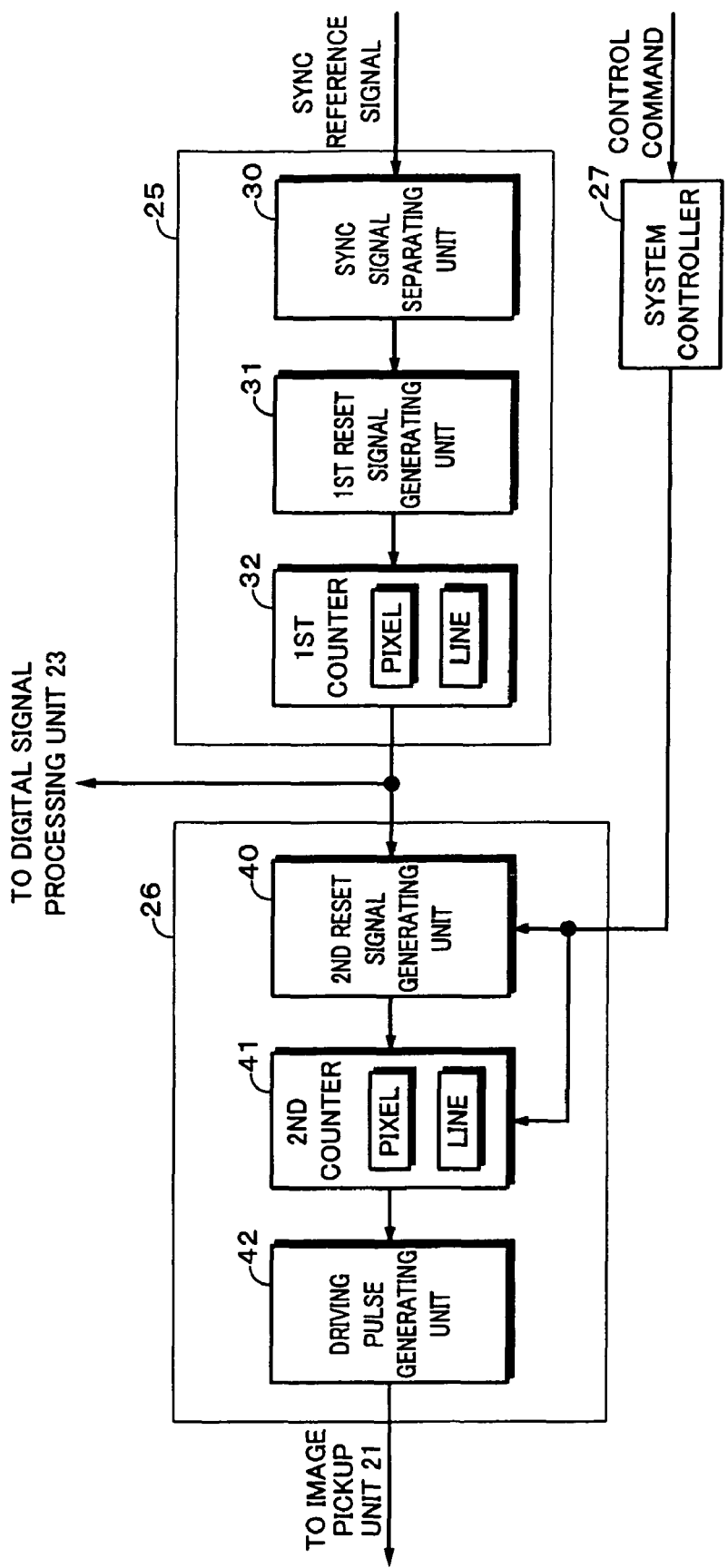
FIG. 6 is a block diagram showing a construction of an example of a timing signal generating unit 25 and an image pickup timing signal generating unit 26.

FIG. 6 shows a construction of an example of the timing signal generating unit 25 and the image pickup timing signal generating unit 26 in the image pickup apparatus 11. The timing signal generating unit 25 has, for example, a sync signal separating unit 30, a first reset signal generating unit 31, and a first counter 32. The sync signal separating unit 30 separates a vertical sync signal and a horizontal sync signal from the sync reference signal supplied from the controller 10 and extracts clocks. The vertical sync signal, horizontal sync signal, and clocks are supplied to the first reset signal generating unit 31. The clocks are also supplied to a second reset signal generating unit 40, which will be explained hereinafter. The first reset signal generating unit 31 forms a reset signal on the basis of the vertical sync signal and the horizontal sync signal supplied from the sync signal separating unit 30 and transfers the formed reset signal and the clocks supplied from the sync signal separating unit 30 to the first counter 32.

The first counter 32 is reset by the reset signal supplied from the first reset signal generating unit 31 and counts the pixel position and the line position synchronized with the sync reference signal. A pixel count value (showing the pixel position in the line) and a line count value (showing the line position in the frame) which have been counted by the first counter 32 are supplied to the digital signal processing unit 23 as a reading timing signal to instruct the reading timing of the video frame from the memory 24 and also supplied to the image pickup timing signal generating unit 26.

On the basis of the setting of the image pickup speed, the controller 10 forms the frame ratio and a frame sequence number, which will be explained hereinafter. The frame ratio and the frame sequence number are supplied as a control command to the system controller 27 of each of the image pickup apparatuses 11, 11, . . . . On the basis of the frame ratio and the frame sequence number supplied from the controller 10, the system controller 27 forms a signal showing the number of pixels per line of the image pickup frame and information showing a reset phase, which will be explained hereinafter, and supplies them to the image pickup timing signal generating unit 26.

The image pickup timing signal generating unit 26 has, for example, the second reset signal generating unit 40, a second counter 41, and a driving pulse generating unit 42. On the basis of the pixel count value and the line count value of the video frame and the clocks which were supplied from the first counter 32 and the information (showing the reset phase) supplied from the system controller 27, the second reset signal generating unit 40 forms the reset signal, at predetermined timing, to reset the value of the second counter 41. The formed reset signal is supplied to the second counter 41. The clocks are also supplied from the second reset signal generating unit 40 to the second counter 41.

The second counter 41 sets an upper limit value of the pixel count value in the second counter 41 on the basis of the signal (showing the number of pixels per line of the image pickup frame) supplied form the system controller 27. The second counter 41 is reset on the basis of the reset signal supplied form the second reset signal generating unit 40 and starts the operation to count the pixel position in the line of the image pickup frame and the line position in one image pickup frame. That is, by resetting the second counter 41, the head position of the image pickup frame is designated. The pixel count value (showing the pixel position in the line) and the line count value (showing the line position in the frame) counted by the second counter 41 are supplied to the driving pulse generating unit 42.

In accordance with the pixel count value and the line count value supplied from the second counter 41, the driving pulse generating unit 42 forms the driving pulse to drive the CCD and supplies it to the image pickup unit 21.

In the image pickup apparatus 11 according to the embodiment, by designating the head position of the image pickup frame for a predetermined position of the video frame in accordance with the frame ratio and the frame sequence number, the variable-speed photographing in which the image pickup timing is synchronized among a plurality of image pickup apparatuses 11, 11, . . . can be realized.

FIG. 7 shows correspondence relations of an example among the frame ratio, the frame sequence number, and the head position of the image pickup frame. As the number of pixels, the number of pixels per line of the image pickup frame based on the frame ratio is shown. For example, if the frame ratio is equal to 2/3, it is shown that the number of pixels per line of the image pickup frame is equal to 3300 (pixels). As mentioned above, the number of pixels per line of the image pickup frame can be calculated by multiplying 2200 (pixels) as the number of pixels per line of the video frame by the reciprocal number of the frame ratio.

As frame sequence numbers, a time from the video frame in which the head position of the image pickup frame and the head position of the video frame coincide to the next video frame in which the head position of the image pickup frame and the head position of the video frame coincide is assumed to be one period, and the sequential numbers which are allocated to the video frames in one period are shown. For example, when the frame ratio is equal to 2/3, since one period is constructed by three video frames, "0", "1", and "2" are allocated as frame sequence numbers to the three video frames in one period. The frame sequence number "0" is set to the video frame in which the head timing of the image pickup frame and that of the video frame coincide.

The reset phase indicates the position in the sync reference signal to designate the head position of the image pickup frame and it coincides with the reading position of the video frame. For example, if the reset phase is "line=563, pixel=1100", when the line count value of the counter 32 is equal to "563" and the pixel count value is equal to "1100", the count value of the counter 41 is reset and the head position of the image pickup frame is designated. If there is no disclosure of the reset phase, it is shown that the value of the counter 41 is not reset.

The correspondence relations among the frame ratio, the frame sequence number, and the head position of the image pickup frame shown in FIG. 7 are preliminarily stored as a table into, for example, a ROM (not shown) connected to the system controller 27. When the control command is supplied, the system controller 27 obtains the number of pixels per line in the image pickup frame and the reset phase with reference to the table on the basis of the frame ratio and the frame sequence number which were multiplexed to the control command. The invention is not limited to such a construction but, for example, the number of pixels and the reset phase may be also calculated on the basis of the frame ratio and the frame sequence number.

A method of executing the variable-speed photographing by using the correspondence relations among the frame ratio, the frame sequence number, and the head position of the image pickup frame shown in FIG. 7 will now be described with reference to FIGS. 8A to 8E. FIG. 8A shows the writing timing and the reading timing of the data in the bank (a). FIG. 8B shows the writing timing and the reading timing of the data in the bank (b). FIG. 8C shows the writing timing and the reading timing of the data in the bank (c) FIG. 8D shows the timing when the frame ratio and the frame sequence number are supplied from the controller 10 to the system controller 27. FIG. 8E shows the timing corresponding to the frame head position based on the sync reference signal.

In this example, the frame ratio at the start of the photographing is set to 2/3, thereafter, the frame ratio is changed to 1/2 at a time point A, and the frame ratio is changed to 1/3 at a time point B. That is, assuming that the frame frequency of the video frame is equal to 30 Hz and the number of pixels per line is equal to 2200 (pixels), the frame frequency of the image pickup frame until a position A is equal to 20 Hz and the number of pixels per line is equal to 3300 (pixels). The frame frequency of the image pickup frame from the time point A to the time point B is equal to 15 Hz and the number of pixels per line is equal to 4400 (pixels). Further, the frame frequency of the image pickup frame after the time point B is equal to 10 Hz and the number of pixels per line is equal to 6600 (pixels).

The controller 10 outputs the frame ratio and the frame sequence number every image pickup frame on the basis of the designated image pickup speed. The frame ratio and the frame sequence number are supplied to the system controller 27 of each of the image pickup apparatuses 11, 11, . . . and one frame ratio is sent every frame sequence number at arbitrary timing in one frame of the sync reference signal.

The system controller 27 decides the reset phase and the number of pixels per line of the image pickup frame with reference to the foregoing table on the basis of the frame ratio and the frame sequence number. The second counter 41 is reset at the timing shown by the reset phase of the sync reference signal, further, an upper limit value of the pixel count value is set on the basis of the number of pixels per line of the image pickup frame, and the photographing is started. The data of the photographed image pickup frame #1 is written into the bank (a) in the memory 24 (FIG. 8A).

The frame ratio and the frame sequence number (frame ratio=2/3, frame sequence number=0) are outputted from the controller 10 and supplied to the system controller 27 (FIG. 8D). The head in the sync reference signal just after the frame ratio and the frame sequence number were supplied becomes the head position of the video frame #11. When the count value of the first counter 32 is set to "line=0, pixel=1" in accordance with the value of the reset phase based on the frame ratio and the frame sequence number, the second counter 41 is reset and the photographing of one image pickup frame is started. The data of the photographed image pickup frame #2 is written into the bank (b) in the memory 24 (FIG. 8B). The data of the image pickup frame #1 written in the bank (a) is read out as a video frame #11 on the basis of the sync reference signal from the head position of the frame based on the sync reference signal which is received after completion of the writing of the data of the image pickup frame #1.

The frame ratio and the frame sequence number (frame ratio=2/3, frame sequence number=1) are outputted from the controller 10 and supplied to the system controller 27. The head in the sync reference signal just after the frame ratio and the frame sequence number were supplied becomes the head position of the video frame #12. When the count value of the first counter 32 is set to "line=563, pixel=1100" in accordance with the value of the reset phase based on the frame ratio and the frame sequence number, the second counter 41 is reset and the photographing of one image pickup frame is started. The data of the photographed image pickup frame #3 is written into the bank (c) in the memory 24 (FIG. 8C). Since the writing of the data of the image pickup frame #2 is not completed yet at a point when the reading of the video frame #11 has been completed, the data of the image pickup frame #1 written in the bank (a) is read out again as a video frame #12 on the basis of the sync reference signal.

The frame ratio and the frame sequence number (frame ratio=2/3, frame sequence number=2) are outputted from the controller 10 and supplied to the system controller 27. The head in the sync reference signal just after the frame ratio and the frame sequence number were supplied becomes the head position of the video frame #13. In the case of the frame ratio and the frame sequence number, since the reset phase is not set, the photographing is not executed. The data of the image pickup frame #2 written in the bank (b) is read out again as a video frame #13 on the basis of the sync reference signal from the head position of the frame based on the sync reference signal which is received after completion of the writing of the data of the image pickup frame #2.

The frame ratio and the frame sequence number (frame ratio=1/2, frame sequence number=0) are outputted from the controller 10 and supplied to the system controller 27. The head in the sync reference signal just after the frame ratio and the frame sequence number were supplied becomes the head position of the video frame #14. When the frame ratio and the frame sequence number are supplied to the system controller 27, the frame ratio is changed from 2/3 to 1/2 at the time point A, the upper limit value of the pixel count value set in the second counter 41 is set from 3300 pixels to 4400 pixels, and the image pickup speed is changed.

In a manner similar to the above, the frame ratio and the frame sequence number are supplied to the system controller 27. The photographing is executed on the basis of the frame ratio and the frame sequence number and the writing of the image pickup frame and the reading of the video frame are executed.

The frame ratio and the frame sequence number (frame ratio=1/3, frame sequence number=0) are outputted from the controller 10 and supplied to the system controller 27. The head in the sync reference signal just after the frame ratio and the frame sequence number were supplied becomes the head position of the video frame #20. When the frame ratio and the frame sequence number are supplied to the system controller 27, the frame ratio is changed from 1/2 to 1/3 at the time point B, the upper limit value of the pixel count value set in the second counter 41 is set from 4400 pixels to 6600 pixels, and the image pickup speed is changed.

As mentioned above, by designating the timing for writing the head position of the image pickup frame by using the timing for reading out a predetermined pixel of the video frame synchronized with the sync reference signal on the basis of the correspondence relations among the frame ratio, the frame sequence number, and the head position of the image pickup frame shown in FIG. 7, the image pickup frames of the plurality of image pickup apparatuses 11, 11, . . . can be synchronized.

Although the embodiment has been described in the example of the method of executing the variable-speed photographing in the case where the frame ratio is set to 2/3, 1/2, and 1/3, the invention is not limited to such an example. For instance, the frame ratio can be also applied to an arbitrary frame ratio in a range from 1/30 to 30/30. That is, the invention can cope with the photographing whose speed lies within a range of 1 to 30 times. Although the embodiment has been described with respect to the case where the frame size of the video frame is set to 2200 pixels×1125 lines, it is an example and the invention can be also applied to the case of another frame size. In other words, in the foregoing embodiment, since the image pickup apparatuses 11, 11, . . . are controlled by supplying the frame ratio and the frame sequence number as a control command to those image pickup apparatuses, even in the case where the reference numbers of pixels (specifications) are different for the image pickup apparatuses, they can be controlled and the compatibility of the control command can be held.

Further, although the case where the reset phase is determined on the basis of the frame ratio and the frame sequence number which are sent from the controller 10 to the system controller 27 has been described, the invention is not limited to such a case but, for example, information showing the reset phase may be also directly supplied from the controller 10 to the system controller 27.

Although the embodiment of the invention has been described in the case of controlling a plurality of image pickup apparatuses by using the controller, the invention is not limited to such a case. For example, it is also possible to construct in such a manner that one image pickup apparatus is substituted for the controller 10 and the frame ratio and the frame sequence number at which its own apparatus operates are transmitted to other image pickup apparatuses, thereby synchronizing the image pickup frames of a plurality of image pickup apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A multicamera system, comprising:
   a controller having a reset phase transmitting unit to transmit information showing a reset phase corresponding to a pixel count value in a frame synchronized with a sync reference signal to one or each of a plurality of image pickup apparatuses within a frame period of a one-precedent frame of said frame, said reset phase being based on a frame ratio of a frame frequency of an image pickup frame to a frame frequency of a video frame synchronized with the sync reference signal, and a frame sequence number showing a number allocated to the video frame; and
   said one or said plurality of image pickup apparatuses each having
      an image pickup unit to photograph light from an object,
      a system controller configured to determine a number of pixels per line based on the frame ratio and the frame sequence number;
      an image pickup driving unit to drive said image pickup unit to start a photographing of one image pickup frame based on said reset phase, said pixel count value, and said number of pixels per line, and an output unit to output image pickup data of the one image pickup frame photographed by said image pickup unit based on said sync reference signal, which has been transmitted from said controller.

2. The system according to claim 1, wherein the information showing said reset phase includes:
the frame ratio, which shows a ratio of a number of pixels per line of the video frame to a count value at a time when a number of pixels per line of the one image pickup frame is counted by clocks based on said sync reference signal, and
the frame sequence number, which is allocated to the video frame in a period at which a head position of the one image pickup frame and a head position of the video frame coincide.

3. The system according to claim 1, wherein the one image pickup frame has a frame period different from that of the frame based on said sync reference signal.

4. An image pickup control method implemented by an imaging system, the image pickup control method comprising:
transmitting, with a control unit, information showing a reset phase corresponding to a pixel count value in a frame synchronized with a sync reference signal to one or each of a plurality of image pickup apparatuses within a frame period of a one-precedent frame of said frame, said reset phase being based on a frame ratio of a frame frequency of an image pickup frame to a frame frequency of a video frame synchronized with the sync reference signal, and a frame sequence number showing a number allocated to the video frame;
determining a number of pixels per line based on the frame ratio and the frame sequence number;
allowing, with an image pickup timing signal generating unit, said one or each of said plurality of image pickup apparatuses to start a photographing of one image pickup frame based on said reset phase, said pixel count value, and said number of pixels per line; and
outputting, with an image pickup unit, image pickup data of the one image pickup frame obtained by said photographing based on the sync reference signal.

5. The method according to claim 4, wherein the information showing said reset phase includes:
the frame ratio, which shows a ratio of a number of pixels per line of the video frame to a count value at a time when a number of pixels per line of the one image pickup frame is counted by clocks based on said sync reference signal, and
the frame sequence number, which is allocated to the video frame in a period at which a head position of the one image pickup frame and a head position of the video frame coincide.

6. A controller to control one or a plurality of image pickup apparatuses, the controller comprising:
a reset phase transmitting unit configured to transmit information showing a reset phase corresponding to a pixel count value in a frame synchronized with a sync reference signal to said one or each of said plurality of image pickup apparatuses within a frame period of a one-precedent frame, said reset phase being based on a frame ratio of a frame frequency of an image pickup frame to a frame frequency of a video frame synchronized with the sync reference signal, and a frame sequence number showing a number allocated to the video frame, a number of pixels per line to be determined based on the frame ratio and the frame sequence number, a photographing of one image pickup frame to be started based on said reset phase, said pixel count value, and said number of pixels per line.

7. The controller according to claim 6, wherein the information showing said reset phase includes:
the frame ratio, which shows a ratio of a number of pixels per line of the video frame to a count value at a time when a number of pixels per line of an image pickup frame is counted by clocks based on said sync reference signal, and
the frame sequence number, which is allocated to the video frame in a period at which a head position of the image pickup frame and a head position of the video frame coincide.

8. An image pickup apparatus control method of controlling one or a plurality of image pickup apparatuses, the image pickup apparatus control method comprising:
transmitting, with a control unit, information showing a reset phase corresponding to a pixel count value in a frame synchronized with a sync reference signal to said one or each of said plurality of image pickup apparatuses within a frame period of a one-precedent frame, said reset phase being based on a frame ratio of a frame frequency of an image pickup frame to a frame frequency of a video frame synchronized with the sync reference signal, and a frame sequence number showing a number allocated to the video frame, a number of pixels per line to be determined based on the frame ratio and the frame sequence number, a photographing of one image pickup frame to be started based on said reset phase, said pixel count value, and said number of pixels per line.

9. The method according to claim 8, wherein the information showing said reset phase includes:
the frame ratio, which shows a ratio of a number of pixels per line of the video frame to a count value at a time when a number of pixels per line of an image pickup frame is counted by clocks based on said sync reference signal, and
the frame sequence number, which is allocated to the video frame in a period at which a head position of the image pickup frame and a head position of the video frame coincide.

10. An image pickup apparatus, comprising:
an image pickup unit configured to photograph light from an object;
an image pickup driving unit configured to drive said image pickup unit to start a photographing of one image pickup frame based on a pixel count value, a number of pixels per line, and a reset phase corresponding to the pixel count value, in a frame, synchronized with a sync reference signal transmitted from an outside, said reset phase being based on a frame ratio of a frame frequency of an image pickup frame to a frame frequency of a video frame synchronized with the sync reference signal, and a frame sequence number showing a number allocated to the video frame;
a system controller configured to determine the number of pixels per line based on the frame ratio and the frame sequence number; and
an output unit configured to output image pickup data of the one image pickup frame photographed by said image pickup unit based on said sync reference signal, which has been transmitted from the outside.

11. The apparatus according to claim 10, wherein the frame ratio shows a ratio of a number of pixels per line of the video frame to a count value at a time when a number of pixels per line of the one image pickup frame is counted by clocks based on said sync reference signal, and the frame sequence number is allocated to the video frame in a period at which a head position of the one image pickup frame and a head position of the video frame coincide.

12. An image pickup method implemented by an image pickup apparatus, the image pickup method comprising:

starting, with an image pickup timing signal generating unit, a photographing of one image pickup frame based on a pixel count value, a number of pixels per line, and a reset phase corresponding to the pixel count value, in a frame, synchronized with a sync reference signal transmitted from an outside, said reset phase being based on a frame ratio of a frame frequency of an image pickup frame to a frame frequency of a video frame synchronized with the sync reference signal, and a frame sequence number showing a number allocated to the video frame;

determining the number of pixels per line based on the frame ratio and the frame sequence number; and outputting, with an image pickup unit, image pickup data of the one image pickup frame obtained by said photographing based on said sync reference signal, which has been transmitted from the outside.

13. The method according to claim 12, wherein the frame ratio shows a ratio of a number of pixels per line of the video frame to a count value at a time when a number of pixels per line of the one image pickup frame is counted by clocks based on said sync reference signal, and the frame sequence number is allocated to the video frame in a period at which a head position of the one image pickup frame and a head position of the video frame coincide.

14. The system according to claim 1, wherein the output unit outputs three images of the one image pickup frame.

* * * * *